United States Patent [19]

Duve

[11] Patent Number: 5,005,382
[45] Date of Patent: Apr. 9, 1991

[54] ELECTROMECHANICAL MOTOR REVERSING

[75] Inventor: John P. Duve, Brookfield, Ill.

[73] Assignee: Eaton Corporation, Cleveland, Ohio

[21] Appl. No.: 465,832

[22] Filed: Jan. 16, 1990

[51] Int. Cl.$^5$ ............................................. D06F 37/40
[52] U.S. Cl. .................................. 68/12.16; 318/281; 318/284; 318/443
[58] Field of Search ...................... 68/12 R, 23.7, 133; 318/281, 284, 443

[56] References Cited

U.S. PATENT DOCUMENTS

| | | | |
|---|---|---|---|
| 1,816,033 | 7/1931 | Wilsey | 68/133 X |
| 2,537,155 | 1/1951 | Olsen | 318/284 X |
| 2,756,580 | 7/1956 | Castner | 68/133 X |
| 3,247,435 | 4/1966 | Baumhart et al. | 318/443 X |
| 3,375,685 | 4/1968 | Scott | 68/23.7 X |
| 3,601,675 | 8/1971 | Raotke | 318/284 X |

Primary Examiner—Philip R. Coe
Attorney, Agent, or Firm—R. A. Johnston

[57] ABSTRACT

An electromechanical A.C. motor reverser having a timed cam-driven SPDT switch with the side terminals thereof connected to separate motor stator coils. The movement of the transfer blade between contacts to break one motor coil circuit and complete the other reversing motor coil circuit is delayed sufficiently by the cam to permit the motor rotor speed to decay enough to enable reversal of rotation upon completion of the reversing coil circuit. The minimum contact transfer time is set at the period corresponding to two cycles of power line current.

6 Claims, 1 Drawing Sheet

ELECTROMECHANICAL MOTOR REVERSING

The present invention relates to devices for rapidly reversing the direction of rotation of a drive motor employed for reciprocal or oscillating drives. One common application of an oscillating or reciprocating drive is the drive for the agitator of a household washing machine which provides for sudden alternating reversal of rotation of the agitator during the washing cycle of the machine program. Typically in such washing machines, a continuously rotating drive motor produces alternating reversed rotation of the agitator shaft by means of a mechanically reversing lost-motion linkage or gear train. This type of drive has required an expensive and mechanically complicated Power transmission to interconnect the electric drive motor and the agitator.

Attempts have been made to eliminate the mechanical drive transmission between the electric drive motor and the agitator in a washing machine by employing electronic controllers for reversing the motor current at specified intervals or at a desired frequency. However, such attempts have required costly electronic circuitry which has been prohibitively costly for high volume mass production of washing machines and have necessitated solid state switching devices capable of switching and carrying the inrush current of the drive motor which may exceed four or five times the steady state running current of the motor. The solid state switching devices required in such applications must be rated at power levels several orders of magnitude greater than the rated power of the motor. Thus, electronic motor reversal for washing machine agitators has been prohibitively costly for high volume manufacture of household washing machines.

Accordingly, it has long been desired to provide a way or means of relatively inexpensively switching the motor current for a washing machine for rapid reversal thereof to enable direct coupling of the motor to the agitator in the washing machine tub thereby eliminating the need for a complicated expensive mechanical reversing transmission.

SUMMARY OF THE INVENTION

The present invention provides an electromechanical programmer timer for operating an alternating current motor in successive rapidly alternating reversible rotation. The motor reversing programmer of the present invention employs a rotating cam advanced at a timed rate by suitable preferably synchronous timing motor drive. A single-pole double-throw switch has the transfer contact blade thereof disposed for following the cam for completing separate circuits. Stationary side contacts are disposed on opposite sides of the transfer blade for alternately making and breaking a circuit to separate stator windings of a drive motor employed for powering an appliance function. The programmer of the present invention is particularly applicable to reversing a motor connected to drive an agitator for a washing machine tub.

For a drive motor operating on alternating current, typically 50–60 Hz, the rate of rotation of the cam and the contour of the cam are set so as to cause the transfer time between the breaking of one set of side contacts and the closing of the opposite set of side contacts comprises a time interval not less than two periods of the power line frequency. The controlled delay between break and make of the contact transfer permits enough decay in rotor speed to enable the reversed magnetomotive torque motor rotor to effect stoppage and counter rotation of the rotor for a desired interval.

The present invention permits rapid successive reversible rotation of a motor by electromechanical means without employing costly electronic switching devices.

DETAILED DESCRIPTION

Figure 1:
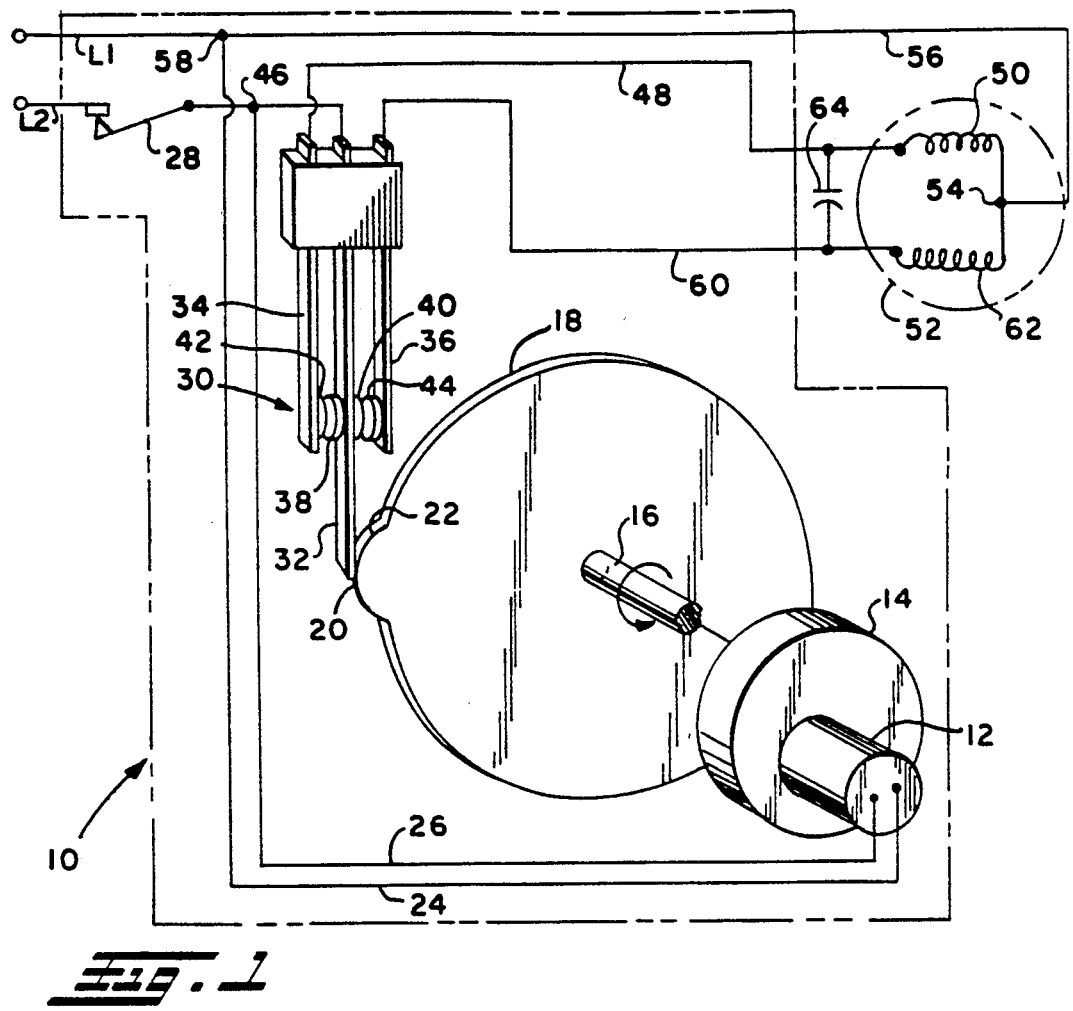
FIG. 1 is a pictorial schematic of the programmer timer of the present invention.

Referring to the drawings, the programmer controller of the present invention is indicated generally at 10 and has a preferably synchronous timing motor 12 connected drivingly through a speed reducer 14. The output of speed reducer 14 is connected to drive shaft 16 which is drivingly connected to a cam drum or disc 18 which has a cam lobe 20 having a ramp surface 22 provided thereon.

The motor 12 has one lead 24 thereof connected to one side $L_1$ of a 60 Hertz alternating current power line, typically 120 volts at 60 Hertz and the other lead 26 connected to the other side $L_2$ via line switch 28. A motor reversing switch indicated generally at 30 has the center or contact transfer blade thereof denoted by reference numeral 32 and is disposed to be self-biased against cam disc 18 to thereby follow the surface of ramp 22 and lobe 20.

Switch 30 has disposed on opposite sides of the transfer contact 32 side contact blades 34,36. The transfer blade 32 has disposed thereon a double sided electrical contact 38,40 with side contact blade 34 having an electrical contact 42 disposed adjacent the contact 38. The side contact blade 36 has disposed thereon an electrical contact 44 which is adjacent contact 40 of the center transfer blade.

Switch 30, is illustrated in FIG. 1 as having the center contact transfer blade raised by the cam lobe 20 to close contact set 42,38 and break contact set 40,44. It will be understood that rotation of the cam 18 until ramp 22 has passed completely from under the transfer blade 32 that contact set 42,38 is broken and contact set 40,44 is closed. Switch 30 has the center or transfer contact blade 32 connected via junction 46 to power line switch 28; and, side blade 34 is connected via lead 48 to one side of a first stator coil 50 of drive motor 52. The opposite side of coil 50 is connected via junction 54 and lead 56 to junction 58 and side $L_1$ of the power line. The side blade 36 of switch 30 is connected via lead 60 to a second stator coil 62 of the motor 52 which coil has its opposite lead connected to junction 54. Typically, a capacitor 64 is provided across the power leads 48,60 for the drive motor 52 to facilitate starting thereof in a manner well known in the art.

In the presently preferred practice, the cam is designed such that the minimum contact transfer time is not less than two (2) cycles of the power line current, or 1/30 of a second for 60 Hertz power. However, it will be understood that the contact transfer time must be chosen to permit rotor speed to decay sufficiently to permit reversing of the rotor rotation. In the presently preferred practice, it has been found satisfactory for reversing rotation of fractional horsepower motors to utilize the aforesaid minimum contact transfer time where the numerical ratio of rotor inertial torque at rated speed to resistive load torque measured at the rotor shaft is not greater than five to one (5:1).

Figure 2:
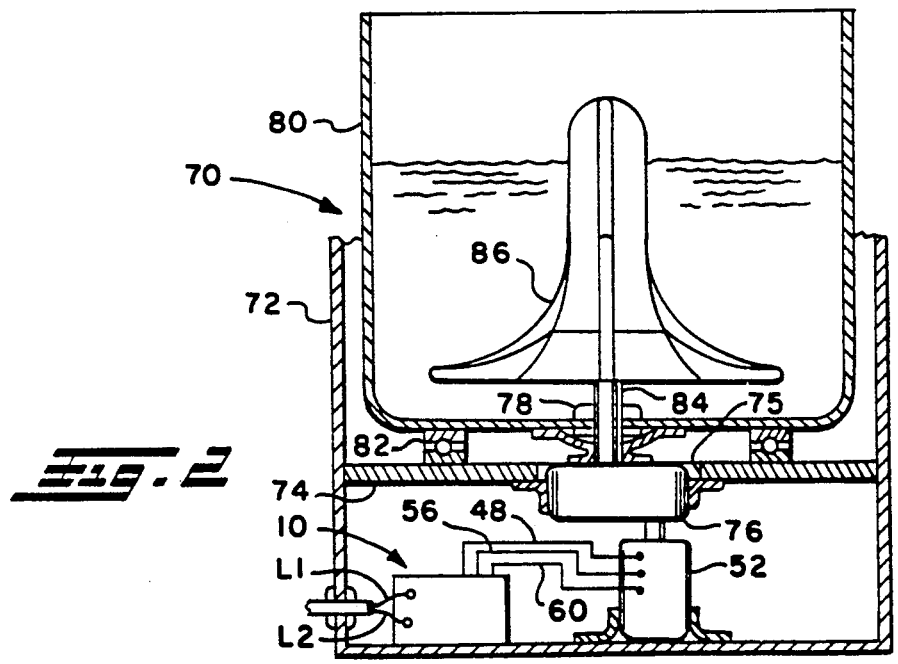
FIG. 2 is a cross-section of a washing machine employing the programmer controller of the present invention.

Referring to FIG. 2, invention is shown as employed in a washing machine indicated generally at 70 as having a casing 72 having a support deck 74 provided therein, the deck has mounted therethrough a speed reducer 76 which has the input shaft thereof connected to the shaft of motor 52 which is mounted in the housing. The output of the speed reducer 76 extends upwardly through deck 74 on aperture 75. A washing tub 80 mounted for rotation on a deck plate by suitable means such as bearing 82. The output of speed reducer 76 is connected to a shaft 84 which extends through a rotary seal 78 into tub 80 and has mounted thereon an agitator 86.

The controller 10 is mounted in the housing 72 and is connected to the motor by leads 56,48,60.

In the presently preferred practice, for a drive motor operating on 60 Hertz line power, cam drum 18 is driven by timing motor 12 and speed reducer 14. Typical ratios for the speed reducer are 4:1 and 5:1; and, typical motor shaft speeds are 1725, 1140 and 800 rpm for high, medium and low speed operation. It has been found satisfactory to operate the agitator 86 at rotational speeds of about 1 rev./sec. (211Rad/sec.) and to permit rotation of the agitator preferably in the range of 45-20 degrees of central angle of rotation before reversing current to the motor for agitator reversal.

The present invention thus provides a single and low cost electromechanical motor reverser which permits driving connection without complicated and costly lost-motion reversing devices.

Although the present invention has hereinabove been described with respect to the illustrated embodiments and presently preferred practice, it will be understood that the invention is capable of modification and variation and is limited only by the following claims.

I claim:

1. A washing machine comprising:
   (a) an alternating current drive motor having plural stator coil segments;
   (b) receptacle means for holding wash water and articles to be washed;
   (c) agitator means mounted within said receptacle means to rotate about an axis;
   (d) speed reducer means connecting said drive motor for effecting rotation of said agitator means;
   (e) electromechanical programmer means operable to effect reversible operation of said drive motor for effecting operation of agitator means, said programmer means having:
       (i) a timing motor;
       (ii) cam means;
       (iii) advance means driven by said timing motor, said advance means operable to effect timed advancement of said cam means;
       (iv) a single-pole double-throw (SPDT) switch with the movable blade thereof operatively disposed for following said cam for controlling current to said drive motor, wherein said cam is operative to delay the contact transfer time of the movable blade of said SPDT switch from breaking one set of contacts to closing the other set of contacts such that said drive motor current is off a predetermined minimum period before closure of said other set of contacts; and,
       (v) said SPDT switch is connected to said drive motor such that said one set of contacts provides current to one stator coil segment and effects rotation of said drive motor in one direction and said other set of contacts provides current to another stator coil segment and effects motor rotation in the opposite direction, whereby said drive motor is intermittently rotated in opposite directions upon advancement of said cam.

2. The washing machine defined in claim 1, wherein said cam is configured to cause the transfer of movable contact between break and make to be not less than the period of two cycles of said drive motor current.

3. A servoactuator mechanism for an appliance comprising:
   (a) a reversible alternating current drive motor;
   (b) speed reducer means driven by said motor and adapted for performing an appliance work function;
   (c) an electromechanical programmer-timer connected for controlling said motor and having:
       (i) a timing motor;
       (ii) a rotatable cam advanced at a predetermined rate by said timing motor;
       (iii) a single-pole double-throw (SPDT) switch having a movable contact blade member operably movable between a first position, closing a first set of electrical contacts and a second position opening said first set and closing a second set of contacts, said SPDT switch series connected with said drive motor such that said second set of contacts reverses motor rotation from said first set; and,
       (iv) follower means operative in response to said advancement of said cam to move said contact member between said first and second positions with said cam configured to provide a predetermined time delay not less than 1/30 second between said first and second positions.

4. The servoactuator defined in claim 3, wherein said cam is operatively connected for continuous rotation by said timing motor.

5. A motorized reversible drive comprising:
   (a) an alternating current drive motor having plural stator coil segments and adapted to have the rotor shaft of said drive motor connected to a device to be driven;
   (b) electromechanical programmer means operable to effect timed intermittent operation of said motor, said programmer means having:
       (i) a timing motor;
       (ii) a rotatable cam;
       (iii) advance means driven by said timing motor, said advance means operable to effect timed advancement of said cam;
       (iv) switch means having a movable contact blade means operably movable between a first state closing a first set of electrical contacts and a second state opening said first set and closing a second set of contacts, said switch means series connected with said drive motor such that said second set of contacts reverses motor rotation from said first set;
       (v) follower means operative in response to said advancement of said cam to move said contact blade means between said first and second states with said cam configured to provide a predetermined time delay not less than 1/30 second between said first and second states.

6. The drive defined in claim 5, wherein said first set of contacts is series connected to a first motor stator coil and said second set of contacts is series connected to a second motor stator coil.

* * * * *